T. E. MURRAY.
METAL VEHICLE WHEEL.
APPLICATION FILED JUNE 17, 1916.
1,212,803.
Patented Jan. 16, 1917.
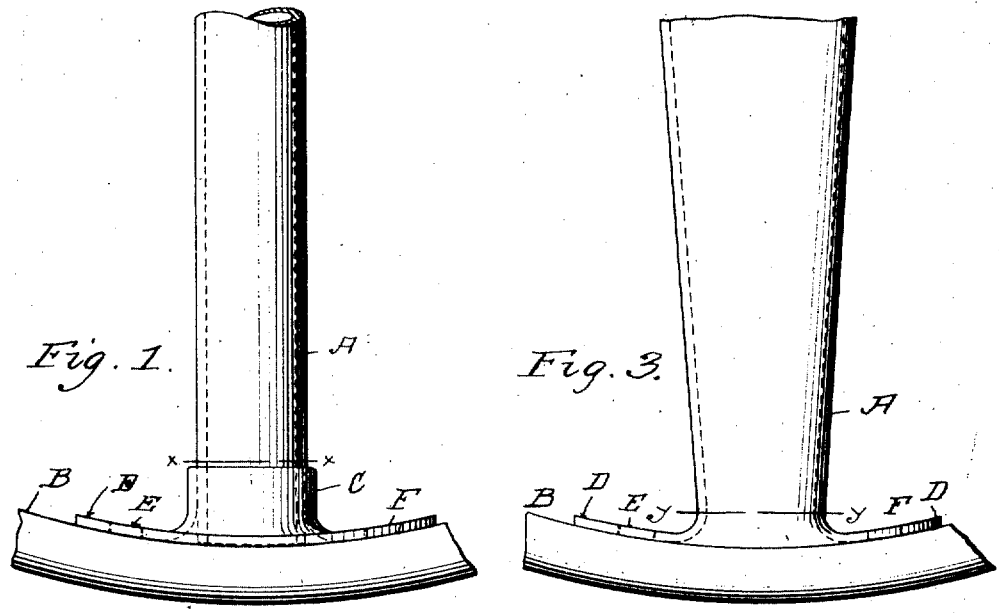
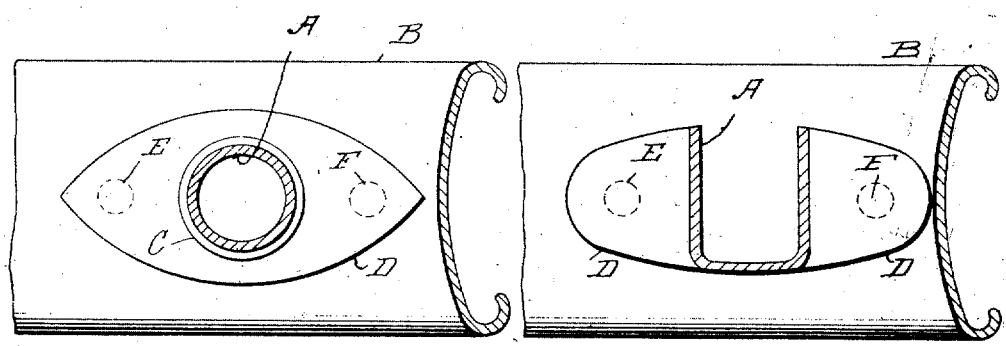
Inventor
Thomas E. Murray
By his Attorney Park Benjamin

UNITED STATES PATENT OFFICE.

THOMAS E. MURRAY, OF NEW YORK, N. Y.

METAL VEHICLE-WHEEL.

1,212,803.  Specification of Letters Patent.  Patented Jan. 16, 1917.

Application filed June 17, 1916. Serial No. 104,171.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists in the construction of the joint between the ends of the spokes and the rim, whereby breakage thereat under shock or strain is prevented.

In the accompanying drawings, Figure 1 is an elevation of my device. Fig. 2 is a cross section on the line $x, x$ of Fig. 1. Fig. 3 is a modified form of my device in which the attaching flange is formed integral with spoke instead of upon a separate sleeve, and Fig. 4 is a cross section on the line $y, y$ of Fig. 3.

Similar letters of reference indicate like parts.

I have found that breakage in metal wheels, and especially those used on automobiles, occurs frequently at or near the joint between spoke and rim. I have also found that I can prevent this difficulty by providing the spoke with a flange, and securing that flange to the inner periphery of the rim at two points or spots disposed in the circumferential line of said rim, so that the metal intervening between said spots will be free from the rim. This intervening metal then by its own resiliency counteracts the applied shocks or strains.

In Fig. 1, A is the outer portion of a tubular metal spoke. B is a portion of the rim to which the spoke is to be secured. C is a sleeve which receives the spoke and has a flange D, preferably of elongated form, such as lenticular or elliptical, with its major axis in the circumferential line of the rim. Said flange is secured, preferably by welding, to the rim at two spots E, F, both in said circumferential line. The butt end of the spoke and the metal of the flange intervening between the spots E, F is free from the rim surface, and this free metal acts, as above stated, by its own resiliency to counteract over-strain—such as commonly occurs when the wheel runs into ruts or over road obstructions. The proper location of the two welds is easily determined once for all for any chosen thickness of the flange metal.

Instead of forming the flange D on a sleeve C separate from the spoke, I may form said flange integrally with the spoke itself, as shown in Figs. 2 and 3, and for the tubular spoke A, I may substitute a channel-shaped spoke, as shown in Fig. 4, the flange D, D then extending from the flat sides of the spoke.

I claim:

1. A metal vehicle wheel, comprising a spoke, a rim, and a flange on the outer end of said spoke and secured to said rim at two spots disposed in the circumferential line of said rim, the said spoke and flange being free from said rim between said spots for a distance sufficient to cause shock or strain applied to the joint between rim and spoke to be counteracted by the resiliency of the metal intervening between said spots.

2. A metal vehicle wheel, comprising a hollow spoke, a rim, and a flange on the outer end of said spoke and homogeneously united to said rim at two spots disposed 180 degrees apart in the circumferential line of said rim, the said spoke and flange being free from said rim between said spots for a distance sufficient to cause shock or strain applied to the joint between rim and spoke to be counteracted by the resiliency of the metal intervening between said spots.

3. A metal vehicle wheel, comprising a spoke, a rim, a sleeve on the outer portion of said spoke, and a flange on said sleeve homogeneously united to said rim at two spots disposed in the circumferential line of said rim, the said flange and the butt end of said spoke between said spots being free from said rim for a distance sufficient to cause shock or strain applied to the joint between rim and spoke to be counteracted by the resiliency of the metal intervening between said spots.

In testimony whereof I have affixed my signature in presence of two witnesses.

THOMAS E. MURRAY.

Witnesses:
 GERTRUDE T. PORTER,
 MAY T. McGARRY.